Patented Feb. 21, 1928.

1,660,167

UNITED STATES PATENT OFFICE.

JEAN KERN, OF NEW YORK, N. Y., ASSIGNOR TO E. I. DU PONT DE NEMOURS & COMPANY, OF WILMINGTON, DELAWARE, A CORPORATION OF DELAWARE.

BASIC DYE.

No Drawing. Application filed December 26, 1922. Serial No. 609,105.

This invention relates to printing and dyeing with basic dyes and has for its general object improvements in the preparation and use of such dyes whereby fast colors are produced more expeditiously and cheaply than heretofore.

One specific object is to provide a basic dye printing color and also a method of using same, whereby the usual "steaming" process can be dispensed with.

A further specific object is to produce dyeing liquors of basic dyes which are capable of dyeing fibers very rapidly, thereby rendering unnecessary the prolonged and repeated immersions heretofore necessary for good results.

A further specific object is to produce dyeing liquors of basic dyes which are perfectly clear solutions.

A further specific object is to produce dyeing liquors of basic dyes which can be used in the cold or at ordinary temperatures.

A further specific object is to provide continous printing and dyeing processes with basic dyes whereby production is greatly increased and great economies made in capital charges, labor and materials.

A further object is to provide basic dye printing and dyeing processes in which the consumption of tannic acid is greatly reduced in comparison with the prior processes, being used substantially in the amount necessary for the color used.

In accordance with the present invention the printing color or dyeing liquor is produced in the form of a solution with an active agent, preferably tannic acid, in suitable solvents as a water soluble aliphatic acid or a mixture thereof with glycerine. The active agent is caused to combine with the basic dye by heating or boiling to effect modification. The modification is preferably complete and this completion is easily determined by diluting a small quantity of the liquor in water. If the modification is not completely affected, the water is colored by the dye. If the modification is completely effected, the lake is precipitated by the water. Thereafter the solution is diluted by an acid solution for use as a dyeing liquor or a thickener is incorporated to produce a printing material. In this manner of preparation a modified dye is produced in solution which readily combines with the fabrics and fast colors are produced with great ease.

As heretofore practised, the printing of fabrics with basic dyes comprised the steps of printing, drying and "steaming" that is, exposing the fabric to the action of steam for one or one and one-half hours for the purpose of producing an insoluble lake on the fibers. Thereafter the fabric was treated with antimony salt, such as tartar emetic.

The present printing process dispenses with the steaming operation, and is particularly adapted for use as a continuous process—that is, the web of the fabric may be passed continuously throughout the process without accumulation for the purpose of "steaming" or the like. The printed material can be completely finished in as little as five minutes. I estimate that the output for the same plant can be increased from seven to ten times by substituting the present for the prior printing processes.

The great advantages of the present invention will appear from the following examples which are given for the purpose of illustrating the invention.

PREPARATION OF PRINTING COMPOUND.

Example I (red).

Mix:

| | Parts by weight. |
|---|---|
| Rhodamine (6 extra poudre) | 10–30 |
| Lactic acid (50%) | 25–75 |
| Water | 25–75 |
| Glycerine solution (containing glycerine, formic acid and benzoic acid in proportions 25:10:1) | 36–108 |
| Tannic solution (containing tannic acid and lactic acid in the proportion 1:2) | 48–145 |

Heat the above mixture for about five minutes preferably to boiling and add 567–856 parts by weight of a thickener, preferably starch containing 10%–20% of acetic acid.

One preferred form of this example comprised 30 grams of rhodamine, 75 parts of lactic acid, 75 parts of water, 108 parts of glycerine solution, 145 parts of tannic solution and 567 parts of acid starch paste.

*Example II (yellow).*

Mix: Parts by weight.
- Auramine O _____ 10–30
- Lactic acid (50%) _____ 25–75
- Water _____ 25–75
- Glycerine solution (containing glycerine, formic acid (85%) and phthalic or tetrachlor-phthalic acid in the proportion 75:30:2) _ 36–108
- Tannic solution (composed of tannin, water and glacial acetic acid in equal parts) _____ 60–180

Heat to 85° C. until the formation of the modified dye is complete, which may be recognized by complete precipitation of color in water upon testing, and add 532–844 parts by weight of thickener containing 10–20% acid.

*Example III (blue).*

Mix: Parts by weight.
- Setocyanine _____ 10–30
- Lactic acid _____ 25–75
- Water _____ 25–75
- Solution glycerine (containing glycerine, formic acid and benzoic acid in proportions 25:10:1) _____ 36–108
- Tannic solution (composed of 3 parts of tannin to two parts of 95% formic) _____ 50–150

This mixture is heated five minutes and 562–854 parts by weight of thickener containing 10% to 20% acid are added.

*Example IV (violet).*

Mix: Parts by weight.
- Methyl violet 2B _____ 10–30
- Water _____ 25–75
- Lactic acid _____ 25–75
- Glycerine solution (containing glycerine, formic acid and benzoic acid in proportions 25:10:1) _____ 36–108
- Tannic solution (composed of tannin, water and glacial acetic acid in equal parts) _____ 93–279

Heat the mixture to 95° C. for ten minutes and add 433–811 parts of thickener containing 10–20% acid.

In printing fabrics with printing compositions according to the present invention which are exemplified by the foregoing examples, the bleached fabric is first printed, well dried and then passed through a bath containing an inorganic mordant preferably an antimony salt such as tartar emetic. Thereafter it is merely necessary to wash and dry. The colors thus produced are fast and enduring and of superior brilliance. For producing darker shades usually of dark colors iron salts may be substituted for the antimony salts. The present invention is not limited to the use of antimony and iron salts as fixing and firming mordants. Any equivalent mordants may be used for this purpose. The Schultz numbers of the dyes employed in the examples are:

Du Pont methylene blue BX, Schultz No. 659.
Auramine O, Schultz No. 493.
Setocyanine, color index No. 663.
Du Pont rhodamine 6GDN, unclassified.

The present invention also comprises the production and application of dyeing liquors which contain a modified basic dye in solution, adapted to deposit on the fibres with greater ease than heretofore.

The solution is produced in the manner closely analogous to the production of the printing compositions, but for the purpose of dyeing no thickener is added and the solutions are preferably diluted by further acid liquids.

The following examples of dyes are given for the purpose of illustrating the manner in which the dyeing liquor is produced.

*Example I (red).*

Mix: Parts by weight.
- Rhodamine (6 extra poudre) _____ 10–30
- Lactic acid (50%) _____ 25–75
- Water _____ 25–75
- Glycerine solution (containing glycerine, formic acid and benzoic acid in proportions 25:10:1) _____ 36–108
- Tannic solution (containing tannic acid and lactic acid in the proportion 1:2) _____ 48–145

Heat the above mixture for about five minutes preferably to boiling and add 10% of acetic acid in quantity depending upon the fabric and the shade required.

One preferred form of this example comprised 30 grams of rhodamine, 75 parts of lactic acid, 75 parts of water, 108 parts of glycerine solution, 145 parts of tannic solution and 567 parts of 10% acetic acid.

*Example II (yellow).*

Mix: Parts by weight.
- Auramine O _____ 10–30
- Lactic acid (50%) _____ 25–75
- Water _____ 25–75
- Glycerine solution (containing glycerine, formic acid (85%) and phthalic or tetrachlor-phthalic acid in the proportion 75:30:2) _____ 36–108
- Tannic solution (composed of tannin, water and glacial acetic acid in equal parts) _____ 60–180

Heat to 85° C. until the formation of the lake is complete, which may be recognized by complete precipitation of the color in water, and dilute with 10-20% acetic, formic or lactic acid.

*Example III (blue).*

Mix:
| | Parts by weight. |
|---|---|
| Setocyanine | 10-30 |
| Lactic acid | 25-75 |
| Water | 25-75 |
| Solution glycerine (containing glycerine, formic acid, and benzoic acid in proportions 25:10:1) | 36-108 |
| Tannic solution (composed of 3 parts of tannin to two parts of 95% formic) | 50-150 |

This mixture is heated five minutes and diluted with 10-20% acetic, formic or lactic acid.

*Example IV (violet).*

Mix:
| | Parts by weight. |
|---|---|
| Methyl violet | 10-30 |
| Water | 25-75 |
| Lactic acid | 25-75 |
| Glycerine solution (containing glycerine, formic acid and benzoic acid in proportion 25:10:1) | 3-108 |
| Tannic solution (composed of tannin, water and glacial acetic acid in equal parts) | 92-279 |

Heat the mixture to 95° C. for 10 minutes and dilute with 10-20% acetic, formic or lactic acid.

In the usual practice of dyeing with basic dyes it is usual first to impregnate the fabric with tannic acid and antimony salt for a considerable time and thereafter to dye with a solution of the basic color in acetic acid, with repeated immersion in the dyeing liquor which is made warmer and warmer as the operation continues. This operation took about five or six hours and it was therefore practically impossible to make the process continuous.

By using the basic coloring liquors prepared according to the invention and exemplified by the foregoing examples, it is possible to dye the cloth by passing through the dye liquor once only and thereafter the dye requires only to be fixed by a firming or fixing bath.

The dyeing process according to the invention is not, however, limited to a single immersion in the dye liquor, as repeated immersions may be made, in some cases with different dyeing liquors. I have, however, been successful in producing fast dyed fabrics of practically all colors by a single immersion with subsequent treatment with a fixing or firming mordant.

The present dyeing process can be operated continuously and as far as I am aware it is the first continuous process of dyeing with basic dyes which is capable of continuous operation. The fabric is fully dyed and in marketable condition in a few minutes after the bleached fabric is fed into the dyeing liquor.

The dyeing operation consists in passing the bleached fabric through the dyeing liquor, pressing between rolls to remove excess of liquor, drying well, passing through a solution of a fixing mordant, for example an antimony salt, such as tartar emetic, washing and drying. No preliminary preparation of the fabric with tannic acid or antimony salt is necessary according to the present invention.

It will be obvious that other solvents or solvent mixtures than those specifically mentioned in the foregoing examples may be employed in preparing the solution of the color and active agent. While water soluble aliphatic acids generally may be employed for this purpose, formic, lactic and acetic acids are preferred. Similarly, while polyalcohols generally (substances belonging to the broad class having an aliphatic hydrocarbon radical attached to more than one hydroxyl group, for instance, ethylene glycol and glycerine) may be employed in admixture with the acids, in my preferred embodiment, I employ glycerine. If a single solvent is employed instead of a mixture, an acid, for example, formic or lactic acid, should be selected. The use of the mixture of glycerine, lactic acid and formic acid has been shown for illustrative purposes in the examples simply because this mixture has been found to give excellent results.

I have used the term "tannic acid" in the foregoing description and in the appended claims, and by this term I intend to include the material sold under this term and its recognized equivalent and also the material frequently referred to as "tannin".

The dye compositions and processes herein described are adapted for use with cotton, wool, silk and linen fabrics, and in fact to all fibers whether of vegetable or animal origin.

I have found that the brilliancy of the colors produced by the coloring compositions produced according to the present invention is enhanced by a small quantity of certain aliphatic acids, particularly oxalic, citric or tartaric acids or aromatic acids, for example, benzoic, phthalic or chlorophthalic acids. The aromatic acids are preferably incorporated with the initial mixture as shown in the foregoing examples, while it is preferred to use the aliphatic acids in the thickener in the case of the printing compositions and in the diluting liquid in the case of the dyeing liquors. The amount of the aforesaid aliphatic acids should be from 2 to 10 grams per litre of the dyeing composition, and its use according to the lowermost part of this range is preferred. Turkey red oil can also be used as a brightening agent.

An important feature of the present invention resides in the fact that the solution of the modified dye produced according to the present invention can be dried or evaporated and thereafter dissolved with reproduction of their original dyeing properties. The volatile products can readily be recovered and used in the preparation of further batches of dyeing material. The dried product is of gumlike consistency and can readily be redissolved by organic acids such as formic, acetic or lactic acids or the like or mixtures thereof. For example 100 parts of the solid lake can be easily dissolved in 400 parts of water containing 10 to 25% of acid. For printing, it is necessary to add thickener to the desired extent. This property enables the improved dyeing composition to be sold in solid form and the purchaser can immediately dissolve the same and obtain the great advantages of my invention forthwith at the shortest notice.

What I claim is:

1. The method of preparing a color adapted for textile printing which comprises producing a substantially complete solution of a basic color and tannic acid and heating said solution substantially to boiling.

2. The method of preparing a printing composition which comprises substantially completely dissolving a basic dye and tannic acid in a water soluble aliphatic acid, heating and adding a thickener.

3. The method of producing a textile printing color adapted to give a fixed color without steaming, which comprises mixing a solution of a basic color with tannic acid previously dissolved in an aqueous solution of an acid selected from a group consisting of formic, lactic and acetic acids and boiling.

4. The method of producing a textile printing color adapted to give a fixed color without steaming, which comprises separately preparing a solution of a basic color and a solution of tannic acid comprising lactic acid, mixing said solutions and boiling.

5. The method of producing a dye in solid form which comprises mixing a basic color with tannic acid in the presence of an aqueous solvent for the reaction mixture, said solvent comprising an acid selected from a group consisting of formic, acetic or lactic acids, boiling and evaporating to obtain a gumlike product.

6. The method of preparing a coloring medium which comprises mixing a solution of basic dye with a separately prepared solution of tannic acid comprising an aqueous solution of an aliphatic acid and heating until the color is substantially completely precipitated by dilution with an excess of water.

7. The method of preparing a coloring medium which comprises adding a basic dye to tannic acid in the presence of a solvent for both dye and acid, heating the mixture and periodically testing portions thereof for precipitation with an excess of water, said heating being continued until the color is substantially completely precipitated by excess of water.

8. The method of producing a textile printing color adapted to give a fixed color without steaming which comprises dissolving a basic color in an aqueous liquid comprising lactic acid, dissolving tannic acid in an aqueous solution of an acid selected from a group consisting of lactic, acetic and formic acids, mixing the resulting solutions and heating the mixture substantially to boiling.

9. The method of producing a textile printing color adapted to give a fixed color without steaming which comprises mixing a basic color with tannic acid in the presence of a solvent for both the color and tannic acid and heating to complete the reaction.

10. The method of preparing a textile printing composition which comprises preparing a solution comprising rhodamine, lactic acid, water, glycerine, formic acid, benzoic acid and tannic acid, boiling and adding a thickener.

11. The method of preparing a textile printing composition which comprises mixing substantially 30 parts of basic dye, 75 parts lactic acid, 75 parts water, 108 parts of glycerine solution (which comprises glycerine, formic acid and benzoic acid in the proportions of 25:10:1) and 145 parts of tannic acid solution (which comprises tannic acid and lactic acid in the proportions 1:2) heating for five minutes to boiling and adding 567 parts of starch paste, with 10% acetic acid.

12. The method of preparing a dye which comprises producing a solution of a basic dye and tannic acid together with an aromatic acid selected from the group consisting of benzoic, phthalic or chlorophthalic acids and heating.

13. The method of preparing a dye which comprises dissolving a basic dye and tannic acid with a water soluble aliphatic acid and an aromatic acid adapted to act as a brightening agent.

14. A basic dye composition adapted for textile printing without steaming comprising a solution resulting from mixing a basic color with tannic acid in the presence of a solvent for the resulting reaction product and heating to complete the reaction.

15. A basic dye composition adapted for textile printing without steaming comprising a solution resulting from mixing a basic dye and tannic acid in the presence of an aqueous solution of an aliphatic acid adapted to dissolve both dye and tannic acid and heating.

16. A basic dye composition obtainable by mixing a solution of tannic acid in an acid selected from a group consisting of lactic, acetic and formic acids with a solution of a basic color in an acid selected from the same group and heating the resulting solution to boiling.

17. A basic dye composition adapted for textile printing without steaming comprising a basic dye and tannic acid in chemical combination in a solution containing a water soluble aliphatic acid and an aromatic acid, said aromatic acid being adapted to function as a brightening agent.

18. A continuous process of fixing basic dyes on fabrics which comprises heating a substantially complete solution of the dye and tannic acid so as to increase the affinity of the dye for fabric, applying the resulting solution to the fabric, drying the fabric and passing it through a solution of a fixing mordant.

19. A process of fixing basic dyes on fabric, which dyes after application ordinarily require steaming to effect fixation, which comprises modifying the dye by causing a substantially complete solution of tannic acid to react with a substantially complete solution of the dye at a temperature not substantially below 95° C. printing the fabric with the so modified dye, drying the printed fabric and mordanting.

20. The composition set forth in claim 16 wherein the solution of the dye comprises an aliphatic poly-alcohol.

21. A printing composition comprising the dye solution set forth in claim 16 in admixture with a solvent and a thickener.

22. Textile material colored with the composition set forth in claim 16.

In testimony whereof I affix my signature.

JEAN KERN.

aqueous solution of an aliphatic acid adapted to dissolve both dye and tannic acid and heating.

16. A basic dye composition obtainable by mixing a solution of tannic acid in an acid selected from a group consisting of lactic, acetic and formic acids with a solution of a basic color in an acid selected from the same group and heating the resulting solution to boiling.

17. A basic dye composition adapted for textile printing without steaming comprising a basic dye and tannic acid in chemical combination in a solution containing a water soluble aliphatic acid and an aromatic acid, said aromatic acid being adapted to function as a brightening agent.

18. A continuous process of fixing basic dyes on fabrics which comprises heating a substantially complete solution of the dye and tannic acid so as to increase the affinity of the dye for fabric, applying the resulting solution to the fabric, drying the fabric and passing it through a solution of a fixing mordant.

19. A process of fixing basic dyes on fabric, which dyes after application ordinarily require steaming to effect fixation, which comprises modifying the dye by causing a substantially complete solution of tannic acid to react with a substantially complete solution of the dye at a temperature not substantially below 95° C. printing the fabric with the so modified dye, drying the printed fabric and mordanting.

20. The composition set forth in claim 16 wherein the solution of the dye comprises an aliphatic poly-alcohol.

21. A printing composition comprising the dye solution set forth in claim 16 in admixture with a solvent and a thickener.

22. Textile material colored with the composition set forth in claim 16.

In testimony whereof I affix my signature.

JEAN KERN.

CERTIFICATE OF CORRECTION.

Patent No. 1,660,167.  Granted February 21, 1928, to

JEAN KERN.

It is hereby certified that error appears in the printed specification of the above numbered patent requiring correction as follows: Page 3, line 28, for the figures "3-108" read "36-108"; and that the said Letters Patent should be read with this correction therein that the same may conform to the record of the case in the Patent Office.

Signed and sealed this 20th day of March, A. D. 1928.

Seal.

M. J. Moore,
Acting Commissioner of Patents.

CERTIFICATE OF CORRECTION.

Patent No. 1,660,167. Granted February 21, 1928, to

JEAN KERN.

It is hereby certified that error appears in the printed specification of the above numbered patent requiring correction as follows: Page 3, line 28, for the figures "3-108" read "36-108"; and that the said Letters Patent should be read with this correction therein that the same may conform to the record of the case in the Patent Office.

Signed and sealed this 20th day of March, A. D. 1928.

Seal.

M. J. Moore,
Acting Commissioner of Patents.